United States Patent Office 3,509,610
Patented May 5, 1970

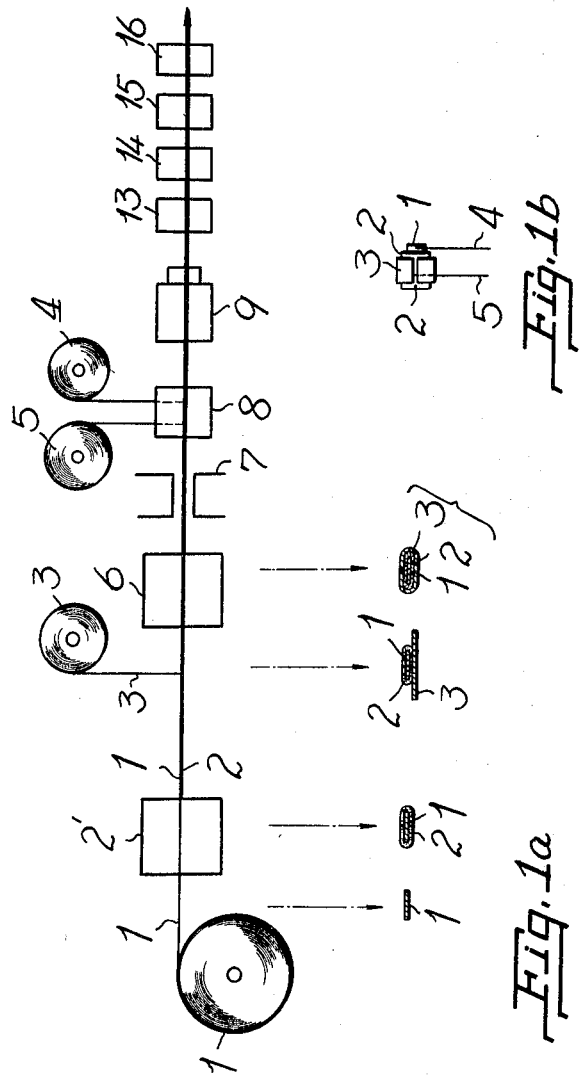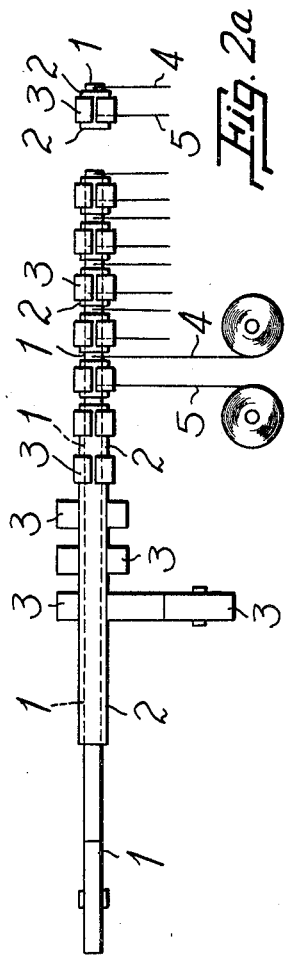

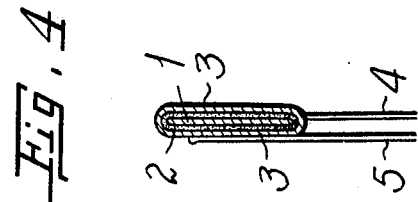
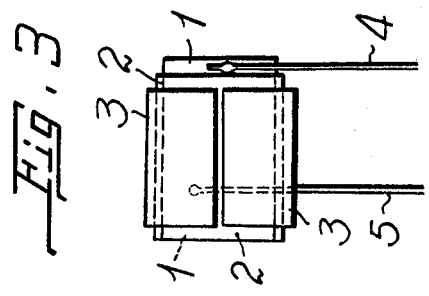
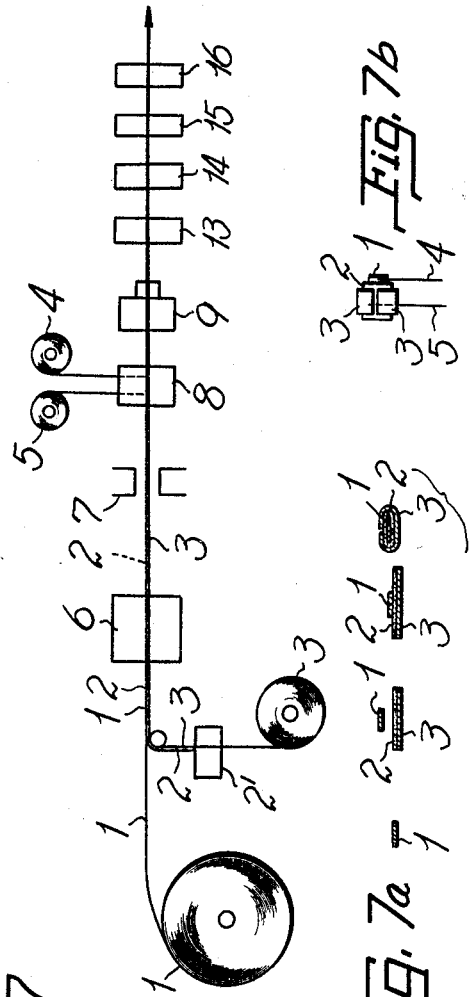

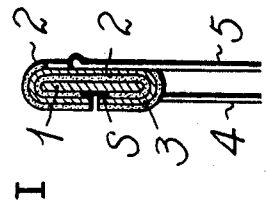
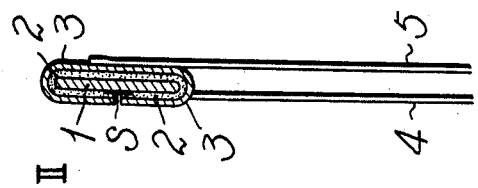
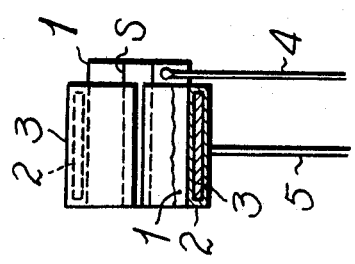
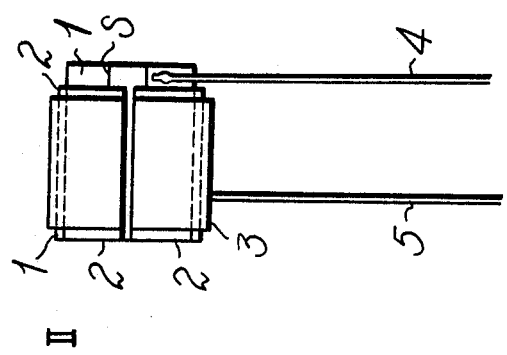

3,509,610
METHOD OF MANUFACTURING CAPACITORS
Sho Masujima, 3366–9 Oaza Ueda, Ueda-shi,
Nagano-ken, Japan
Filed Apr. 11, 1967, Ser. No. 629,972
Claims priority, application Japan, Apr. 28, 1966,
41/27,036, 41/27,037
Int. Cl. H01j 9/00
U.S. Cl. 29—25.42                            8 Claims

ABSTRACT OF THE DISCLOSURE

A method for manufacturing a capacitor wherein the internal electrode is formed from a continuous flat band body of electrically conductive material while the external electrode is formed from a plurality of discrete lengths of a second flat band body wrapped transversely about said first flat band body with a dielectric body disposed at least therebetween. Lead wires are connected to each discrete length of said second band body and to the portion of the first band body associated therewith. The external electrodes are spaced longitudinally along the first flat band body which is cut in the region of said space to define a plurality of discrete capacitors.

---

The present invention relates to a method for manufacturing a capacitor and, more particularly, a method for manufacturing a capacitor wherein a capacitor comprising of an internal electrode of electrically conductive material, a dielectric and an external electrode of electrically conductive material all of which are arranged and disposed from the center of the capacitor in the order named can be produced by a continuous production line.

One of the objects of the present invention is to provide a method for manufacturing the main parts of a capacitor of the type described above in a continuous automatic production line, whereby a high efficiency of production can be obtained; the production process can be simplified; and the production cost can be remarkably reduced.

A further object of the present invention is to provide a method for manufacturing a capacitor of the type described above having a high efficiency in a simple manner wherein the length of the electrodes of the capacitor is made extremely short; the precision of the produced capacitor can be guaranteed; and the capacitor will not break down by external mechanical force applied thereto.

A further object of the present invention is to provide a method of manufacturing a capacitor of the type described above wherein the capacitor will have no crack; and the thickness of the capacitor is relatively thin but of uniform thickness so that the variation of capacitance of the capacitors may be reduced, whereby the capacitors may be produced without testing each to determine its capacitance.

The present invention is characterized in that a flat band body of electrically conductive material is continuously fed into the production line, a plurality of spaced external electrodes are forcibly attached thereupon, and a dielectric is interposed between said internal and external electrodes, whereby the capacitor is comprised of the internal electrode, the dielectric and the external electrode arranged and disposed integrally from the center of the capacitor in the order named. Lead wires are connected to said internal and external electrodes.

As described above, according to the present invention, endless internal and external electrodes may be utilized in the production line so that the main production processes of the capacitor may be accomplished in a continuous production line, whereby the productivity can be improved; the production cost can be reduced because of the economization of the processes and the cost thereof; the plate-shaped capacitor which will not be broken down by external mechanical force applied thereto, can be produced by a simple process; the capacitor assembly can be continuously fed out of the production line in the form of a plate so that the capacitor assembly may be cut into a suitable length having a suitable capacitance; for an ordinary use or purpose, the electrode is not necessarily formed of a metal the price or cost of which is relatively high, so that the cost of the material can be reduced, thus resulting in the economical production; the coating process for applying the coating upon the internal or external electrodes can be readily accomplished with a very uniform thickness so that the variation of capacitance of the capacitors to be produced may be minimized, thus eliminating the need to test each capacitor to determine its capacitance; the distance between the electrodes can be made short so that the capacitance may be improved; the capacitor will not crack and will be stable; a stable product can be obtained without complicated and vigorous quality control; the dielectric can be interposed in contact with the surfaces of the electrodes in a stable manner, the thickness of the dielectric being dependent upon the thickness of the electrode; and a capacitor having a high efficiency can be produced at a low cost Now the invention will be described in detail referring to the preferred embodiments of the present invention illustrated in the accompanying drawing in which:

FIG. 1 is a production line diagram and FIG. 1a and FIG. 1b also illustrates a side view, partly in section, of a blank;

FIG. 2 and FIG. 2a are plan views thereof;

FIG. 3 is a side view of a product;

FIG. 4 is a front view in section thereof;

FIG. 7 is a production line diagram, and also illustrates a side view, partly in section, of a blank in the production line;

FIGS. 7, 7a, 7b, 8, 8a, 9 and 9a are production line diagrams for yet another embodiment of the present invention;

Figure 5:
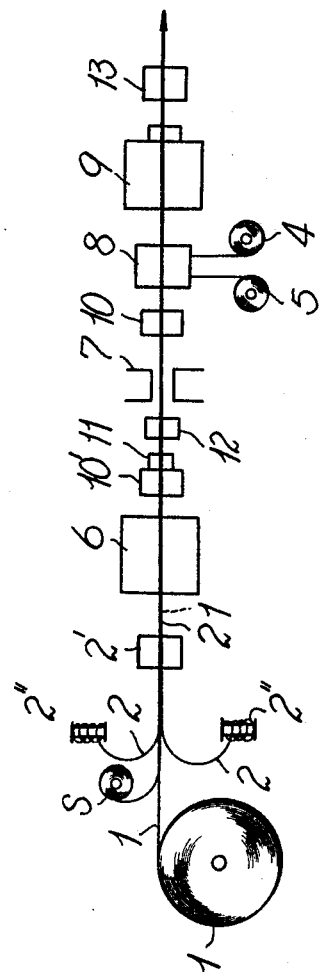
FIGS. 5 and 6 are production line diagrams for another embodiment of the present invention.

FIG. 8I and FIG. 8aII are side views partly in section of the product;

FIG. 9I and FIG. 9aII are longitudinal sectional views of FIG. 8I and FIG. 8aII.

Now reference is made to FIGS. 1, 2, 3 and 4 wherein a capacitor is formed from an internal electrode 1 of electrically conductive material, an intermediate layer 2 of dielectric and an external electrode 3 of electrically conductive material, all being integrally and concentrically arranged and disposed from the center of the internal electrode 1 in the order named. In order to assemble such interior electrode, the dielectric layer and the external electrode into a capacitor as described above, a flat band body 1 of electrically conductive material is continuously fed into the production line and is coated with the dielectric 2 at a tubing station 2'. Thereafter the external electrodes are successively and forcibly attached around the coated internal electrode 1 by an automatic press 6, said external electrodes being disposed so as to be spaced apart from each other.

Then a portion of dielectric coating 2 applied upon the internal electrode 1 in the area exposed between adjacent spaced external electrode 3 is removed from the internal electrode 1 by a removing station 7 comprising a cutter, a grinder wheel or the like. (Note that all of the exposed dielectric coating 2 is removed, a portion thereof being retained as shown in FIG. 3 in order to improve the voltage rating of the capacitor.) Thereafter, lead wires 4 and 5 are welded or soldered at a lead wire connection station 8 to the exposed internal and external electrodes 1 and 3. Then at a cutting station 9 the capacitor assembly is cut at a predetermined position thereof into a suitable length.

In an embodiment illustrated in FIGS. 7, 8 and 9, a capacitor is also composed of an internal electrode 1 of electrically conductive material, an intermediate dielectric layer 2 and an external electrode 3 of electrically conductive material arranged and disposed integrally and concentrically of the center of the internal electrode 1 in the order named. In order to form such a capacitor assembly as described above, a flat band body 1 of electrically conductive material is continuously fed into the production line. An external electrode 3 in a form of a flat band body of electrically conductive material is successively fed into the production line to be coated with the dielectric 2 at a tubing station 2' and discrete lengths of said coated electrode 3 are successively forced into attachment around the internal electrode 1 by an automatic press 6, each external electrode 3 being disposed so as to be spaced apart from adjacent external electrodes. Thereafter, a portion of the dielectric coating 2 on the external electrode 3 is removed at a removing station 7. (The dielectric 2 is removed, only leaving a small portion of said dielectric left exposed in order to improve the voltage rating of the capacitor.) Then, at a lead connecting station 8, lead wires 4 and 5 are soldered or welded to the exposed external electrode 3 and to the internal electrode 1 extending out of the external electrods 3 from which the dielectric was removed. Thereafter the capacitor assembly is cut at a predetermined position into a suitable length.

Figure 6:
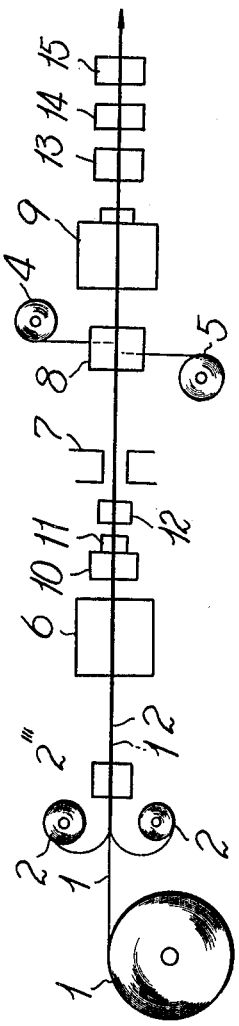

Preferably, internal and external electrodes 1 and 3 will be formed from a metal plate of electrically conductive material such as aluminum, brass, copper, silver or the like. This metal plate is preferably supplied or fed into the production line in the form of band so that the metal plate may be continuously fed into the production line. Dielectric 2 may be formed from a synthetic resin such as polyethylene, polypropylene, polyester, styrol or the like or a material comprising a synthetic resin into which a simple or compound substance of titanium oxide, barium titanate or the like having a lower dielectric loss value is disposed. The injection tubing machine 2' shown in FIGS. 1 and 7 may be used for a continuous injection molding when such dielectric 2 is coated. Furthermore, the dielectric coating material may be made in a form of tape as shown in FIG. 5 and may be wound around the electrode by the winding rolls 2''; or may be applied to the electrode as a laminate way at the application station 2''' as shown in FIG. 6. The external electrodes 3 are fed into the production line intermittently so they are disposed in spaced relation along the internal electrode, having been, cut into a suitable length to provide a predetermined capacitance. Thereafter at the press station 6, the external electrode 3 is bent and forcibly attached to the internal electrode 1 so as to embrace the same. Then, a portion of the exposed dielectric 2 is removed and the lead wires are provided. Then, the capacitor assembly is cut in such a way that the dielectric 2 remains exposed and extended slightly on both ends of the external electrode 3 while at least one end of the external electrode 3 is exposed where said portion of said dielectric had been removed. The internal and external electrodes 1 and 3 are used as the electrodes of a capacitor and are made in a flat plate form. The lead wire 4 is connected to the internal electrode 1 and the lead wire 5 to the outer side face of the external electrode 3 by spot-welding, soldering or the like. The capacitor assembly constructed in this way undergoes the after-treatments such as washing, drying, painting, engraving, etc. as required, and is supplied as the finished product. When a portion of dielectric 2 is not removed, the lead wires may be connected to the cut faces of the electrodes, further the outer surface of the external electrode 3 may be used as the lead wire.

Furthermore, as described hereinbefore, the dielectric 2 may be formed from a synthetic resin formed as a paste into which is added and mixed a single or compound substance of titanium oxide, barium titanate or the like having a less dielectric lower value. However, a dielectric coating layer may be provided (not shown) formed of a synthetic resin or a synthetic resin into which is uniformly dispersed about 2 to 10% by volume of titanium oxide powder or the like having a lower dielectric loss value. This coating layer may be applied between the internal electrode 1 and the synthetic resin dielectric 2; between the external electrode 3 and the synthetic resin dielectric 2; or between the internal and external electrodes 1 and 3.

The dielectric 2 of the synthetic resin or synthetic resin containing titanium oxide or the like is continuously fed and applied to the outer periphery of the internal electrode 1 in the form of a band body as shown in FIG. 1 or to the outer periphery of the external electrode 3 as shown in FIG. 7 by a continuous molding operation. In an embodiment illustrated in FIG. 5, the internal or external electrode 1 or 3 is coated with a thickness, for example, up to 0.04 mm., according to the thickness of the external electrode 3, of a synthetic resin or synthetic resin containing titanium oxide. The synthetic resin may be selected from the synthetic resins such as polyester, polypropylene or the like; or mono-filament fiber, polyester tape or the like whose elasticity is less than the synthetic resin and whose maximum voltage characteristic is relatively as high as the synthetic resin. The number of turns of the fiber, the thickness of the tape, the denier of the fiber, etc. are determined by the thickness of the desired coating. The fiber coating is applied by the winder 2'' as a single or double winding. The tape-shaped external electrode 3 is coated around the external periphery of the internal electrode 1 as an intermediate layer, and is forcibly attached around the internal electrode. If required, the outer dielectric material is raised above a melting point thereof at a heating station 10; then lead wires are provided; and the capacitor assembly is cut into each capacitor. Further another heating station 10' may be provided for heating, higher than its melting point, the outer coating material immediately after the dielectric 2 has been wound as a single or double rope winding by the winder 2'', and then the outer coating material may be made to pass through the die 11; cooled at the cooling station 12 so that the external electrode 3 may be supplied in a form of a winding.

In addition to the above described mono-filament fibers; dielectric, polyester tape 2 to 10 mm. in width and 0.01 to 0.013 mm. in thickness, polyester filament threads 1.80 denier or the like may be used as a winding material. In this case the heating stations 10 and 10' are so adjusted that polyester is heated more than 240° C. and the polypropylene more than 150° C. According to the requirements, the dielectric blank may be dyed. In an embodiment shown in FIG. 6, a dielectric coating of a tape-shaped sheet is continuously supplied to one or to both of the side face of the internal electrode. In the case of the capacitor shown in FIG. 1, the sheet must have a width sufficient to cover the internal electrode 1 and in case of the capacitor shown in FIG. 7 the sheet must be wider than the external electrode 3 so that the dielectric 2 may extend out of the external electrode 3 in order to improve the maximum voltage characteristics of the capacitor to be produced. The supplied dielectric sheet is overlapped and bonded at the bonding station 2''' and thereafter the capacitor is produced in the same production line as described above. The adhesive for bonding the dielectric sheet to the outer electrode may be applied to the surface to be bonded at the time of bonding or directly applied to the surface of said sheet during its formation. In the latter case, the sheet having the adhesive formed thereon would be heated at the heating station to melt the adhesive which would then bond the sheet and electrode, bond together with the electrode, the bonded assembly then being cooled. Further when the dielectric 2 is applied only to one side face of the electrode, the dielectric 2 is laminated with the external electrode 3 so that the dielectric 2 may be in contact with the internal electrode 1 and so that the dielectric may extend beyond the outer periphery of the external electrode 3, whereby the process of removing the dielectric 2 can be eliminated. The process of removing only one exterior portion of the dielectric may be eliminated when the cut face of the external electrode 3 is utilized for connecting the lead wire. In the embodiments illustrated in the accompanying drawings, the lead wires are connected to the electrodes before each of the capacitors is cut out from the assembly and utilized as a handle or holding means for the separate capacitors by the machines in the processes after the cutting process so that mass production may be facilitated. However, the lead wires may be connected to the electrodes after the capacitors are cut out of the assembly. The cut capacitors undergo the processes of washing, drying, engraving, painting, measuring, etc., as required, before the capacitor comes out of the production line as a finished product.

In each embodiment described above, the insulator S may be disposed, if required, between the side edges, i.e. abutting side edges of the external electrode 3, as shown in FIG. 9 which is wrapped about the internal electrode for attachment thereto, so that the maximum voltage property of a capacitor to be produced may be improved. In this case the insulator in a form of tape may be continuously fed in contact with one side face of an internal electrode 1 into the production line before the external electrode 3 is forcibly attached upon the internal electrode 1. The insulator S may thus be assembled together with the electrodes and the dielectric at the same time that the external electrode is forcibly attached on the internal electrode. In any case preferably the capacitor to be produced according to the present invention will be assembled in such a manner that the dielectric 2 extends beyond external electrode 3 and is partially exposed in order to improve the maximum voltage property of the capacitor.

In the drawings, reference numeral 13 indicates the washing and drying station; 14 the engraving station; 15 the paint applying station, and 16 the measuring station.

What I claim is:
1. A method for manufacturing capacitors which comprises, feeding a continuous first flat band body of electrically conductive material; sequentially feeding a plurality of discrete lengths of a second flat band body to the region adjacent said first flat band body; securing a dielectric body at least to one surface of either said first or second band bodies; laterally wrapping each of said discrete lengths of said second band body about said first band body with said dielectric body disposed at least between said first and second band bodies, and with said discrete lengths of second band body longitudinally spaced along said first band body; and cutting said first band body in the region of the space between adjacent lengths of said second band body to define a plurality of capacitors each formed from an external electrode defined by a discrete length of said second band body, an internal electrode defined by the portion of said first band body associated therewith and said dielectric body disposed at least therebetween.

2. A method for manufacturing capacitors, as recited in claim 1, including securing a lead wire to each of said discrete lengths of said second band body and to the portion of said first band body associated therewith before said first band body is cut.

3. A method for manufacturing capacitors, as recited in claim 2, wherein said dielectric body is continuously coated on said first flat band body; said method including removing spaced portions of said dielectric body to expose portions of said first band body, said exposed portions being disposed in the space between adjacent discrete lengths of said second band body, at least one of said leads being secured to said exposed band body at each of said exposed portions.

4. A method for manufacturing capacitors, as recited in claim 1, wherein said dielectric body is secured to at least one surface of said second band body.

5. A method for manufacturing capacitors, as recited in claim 4, including securing a strip of further dielectric material to one face of said first flat band body, said further dielectric material extending longitudinally along said first band body and being positioned so that it will extend between the spaced end edges of each of said discrete lengths of second band body when said lengths of second band body are wrapped about said first band body.

6. A method for manufacturing capacitors, as recited in claim 4, wherein said second band body is coated by said dielectric body, said method including removing a portion of said dielectric from the external face of each of said discrete lengths of said second band body to expose a portion thereof, at least one of said leads being secured to the exposed portion of each of said discrete lengths of said second band body.

7. A method for manufacturing capacitors, as recited in claim 1, wherein said dielectric body is coated on said first flat band body, said method including securing a further strip of dielectric material to one face of said first flat band body, said strip extending longitudinally along said first band body and being positioned to extend between the end edges of each of said discrete lengths of said second band body when said lengths of said second band body are wrapped about said first band body.

8. A method for manufacturing capacitors, as recited in claim 7, including removing spaced portions of said first-mentioned dielectric body to expose portions of said first band body, said exposed portions being positioned to lie between the spaced lengths of said second band body, and securing at least one lead wire to each of said exposed portions of said first band body and to each of said discrete lengths of said second band body.

References Cited

UNITED STATES PATENTS

| 2,384,983 | 9/1945 | Weiss | 242—56 |
| 2,531,389 | 11/1950 | Brandt | 29—25.42 |
| 2,731,706 | 1/1956 | Grouse | 29—25.42 |
| 2,882,586 | 4/1959 | Tzu En Shen | 29—25.42 |
| 3,201,056 | 8/1965 | Fanning | 242—56 |
| 3,227,388 | 1/1966 | Masini | 242—56 |

JOHN F. CAMPBELL, Primary Examiner

R. B. LAZARUS, Assistant Examiner